G. LANING.
STEERING GEAR FOR AUTOMOBILES.
APPLICATION FILED JULY 19, 1909.
953,698.
Patented Apr. 5, 1910.
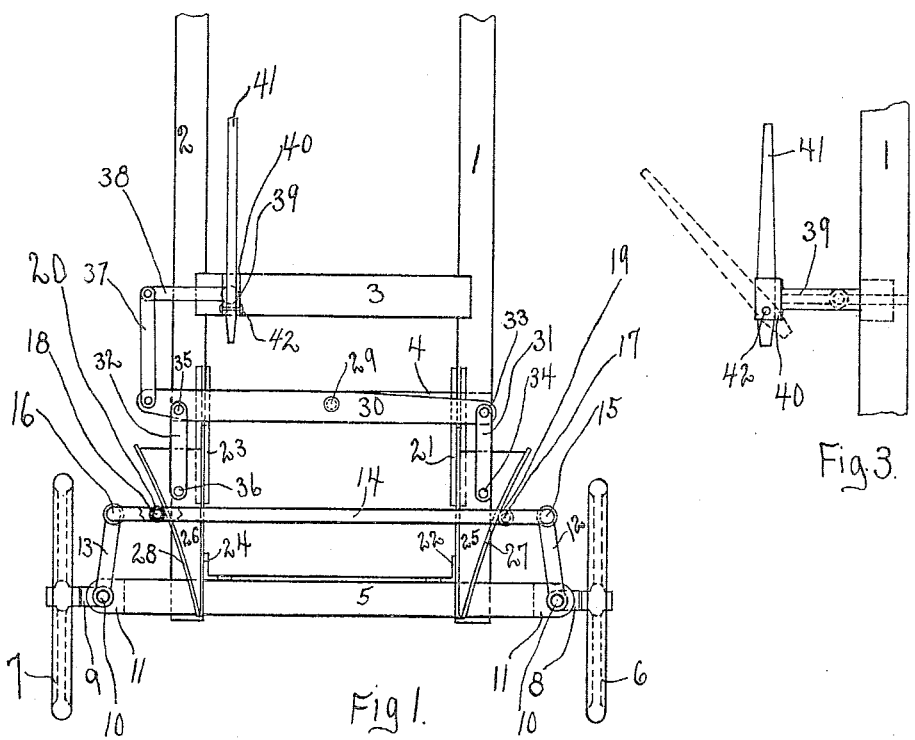
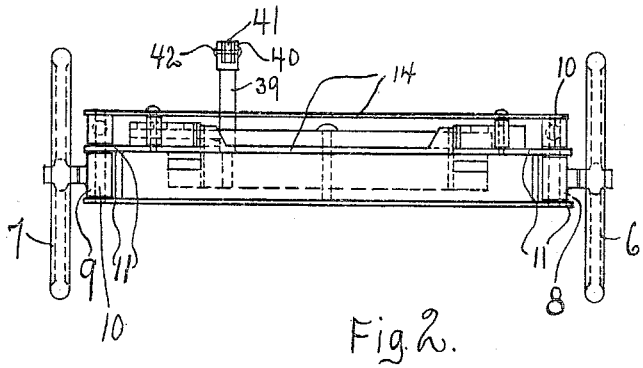
WITNESSES:
William A. Radtke.
C. L. Samson.
INVENTOR
George Laning
BY
Andrew H. Neureuther.
ATTORNEY

UNITED STATES PATENT OFFICE.

GEORGE LANING, OF LA SALLE, ILLINOIS.

STEERING-GEAR FOR AUTOMOBILES.

953,698.      Specification of Letters Patent.      Patented Apr. 5, 1910.

Application filed July 19, 1909. Serial No. 508,522.

*To all whom it may concern:*

Be it known that I, GEORGE LANING, a citizen of the United States, residing in the city of La Salle, county of Lasalle, and State of Illinois, have invented certain new and useful Improvements in Steering-Gear for Automobiles, of which the following is a specification.

My invention relates to improvements in methods for steering power driven vehicles, and the object of my improvements is to produce a steering gear by means of inclined planes, which is very simple, inexpensive and extremely effective in operation. I attain these objects by the mechanism illustrated in the accompanying drawings, in which—

Figure 1 is a top view of my invention, with some of the ordinarily concealed parts shown in section. Fig. 2 is a front view of my invention. Fig. 3 is a side view of my invention showing the tiller.

Similar numerals refer to similar parts throughout several views.

In the drawings, 1 represents the left side-bar of the frame of an automobile, 2 the right sidebar, 3 and 4 the cross bars connecting with the above mentioned side bars, 5 is the front cross bar which connects the front end of sidebars 1 and 2 and to which the stub axles 8 and 9, on which are journaled the front wheels, 6 and 7, are pivotally connected by means of the cylindrical parts 10 of said stub axles which are journaled in the projecting pieces 11 fastened to said front cross bar 5.

Immediately above the bearings in the upper pieces 11 on each of the stub axles are fastened the levers 12 and 13. The ends of these levers are pivotally connected to the ends of a pair of parallel links 14 by means of pins 15 and 16 one link being spaced above the other, one on the upper side of the levers and one on the lower side of same. It is evident that the links 14 thus connect the stub axles 8 and 9 together so that any motion of links 14 to the right or left is immediately transmitted to the wheels 6 and 7 which thus changes the direction of the vehicle, if same is in motion.

Journaled on pins 17 and 18 whose ends are fastened in the links 14 are the rollers 19 and 20 respectively. Slidably mounted in guides 21 and 22 on side bar 1 and 23 and 24 on side bar 2 are the blocks 25 and 26 having the inclined planes 27 and 28 respectively formed thereon. These inclined planes are continually in engagement with said rolls 19 and 20 respectively. Journaled on a pin 29 fastened in cross bar 4 is an equalizer bar 30 which is pivotally connected to these wedges 25 and 26 having the inclined planes 27 and 28 by means of links 31 and 32 and the pins 33 and 34 and 35 and 36 respectively as shown in Fig. 1.

Pivotally connected to the one end of equalizer bar 30 and to the end of a lever 38 is a link 37. Lever 38 is fastened to an upright member 39 which is journaled in cross bar 3 and a bearing standard fastened to 3; member 39 has formed on its upper portion a U-shaped head 40 into which fits one end of the tiller or handle 41 which is pivotally connected therewith by means of a pin 42 in such a manner that tiller 41 can be elevated out of the way of the driver as shown in the dotted lines in Fig. 3 when he desires to get in or out of the automobile.

It is evident from the manner of connecting the inclined planes or wedges with the tiller through the linkages shown that any motion given to the tiller 41 is immediately communicated to the wedges which move in opposite directions to each other, and as either inclined plane is moved forward it engages the roll journaled in the links 14 above mentioned and causes the wheels of the automobile to be turned, while the other roll journaled in said links 14 follows the corresponding inclined plane as it moves backward or in the opposite direction to the inclined plane which is moved forward; thus forming at all times a lock so that if either wheel strikes an obstruction of any kind the wheel must simply pass over it without transmitting the shock to the tiller or causing the wheels to turn at another angle and change the direction of motion of the vehicle. By keeping these wedges or inclined planes close up to the rollers above mentioned, all backlash which is so common and annoying in all other steering devices will be avoided.

It will be understood of course, that while I have here shown one form of my invention, I do not wish to limit myself to the exact construction shown, but wish to have it taken in a sense diagrammatic of all such constructions as come within the scope of my claims.

I claim:

1. A steering gear for automobiles comprising a pair of inclined planes slidably mounted on its frame, a pair of stub axles pivotally mounted on said frame, a link pivotally connected to levers fastened to said stub axles, rolls journaled on said link co-acting with said inclined planes, and means for simultaneously moving said planes in opposite directions.

2. A steering gear for automobiles comprising a pair of stub axles pivotally mounted on the frame, a lever fastened to each of said stub axles, a link pivotally connecting the ends of said levers, a pair of rolls journaled on pins fastened to said link, a pair of inclined planes slidably mounted on said frame engaging said rolls, and means for simultaneously moving said planes in opposite directions, substantially as shown and described.

3. A steering gear for automobiles comprising a frame, a pair of stub axles pivotally mounted on the frame, a lever fastened to each of said stub axles, a link pivotally connecting the ends of said levers, a pair of rolls journaled on pins fastened to said link, a pair of inclined planes slidably mounted on said frame engaging said rolls, a tiller, an equalizer bar pivotally connected to the frame and to each of said planes, and operatively connected with the tiller, substantially as shown and described.

GEORGE LANING.

Witnesses:
W. H. MONTGOMERY,
GEORGE W. PIPER, JR.